(12) United States Patent
Liang

(10) Patent No.: US 12,426,995 B2
(45) Date of Patent: Sep. 30, 2025

(54) ORTHODONTIC SELF-LOCKING SYSTEM ADAPTED TO RIBBON ARCH WIRE

(71) Applicant: Jiaxing Liang, Fuzhou (CN)

(72) Inventor: Jiaxing Liang, Fuzhou (CN)

( * ) Notice: Subject to any disclaimer, the term of this patent is extended or adjusted under 35 U.S.C. 154(b) by 329 days.

(21) Appl. No.: 18/314,212

(22) Filed: May 9, 2023

(65) Prior Publication Data

US 2023/0277280 A1  Sep. 7, 2023

Related U.S. Application Data

(63) Continuation of application No. PCT/CN2021/129410, filed on Nov. 8, 2021.

(30) Foreign Application Priority Data

Nov. 9, 2020 (CN) .......................... 202011242231.5

(51) Int. Cl.
*A61C 7/28* (2006.01)
(52) U.S. Cl.
CPC .................................... *A61C 7/287* (2013.01)
(58) Field of Classification Search
CPC ...................................................... A61C 7/287
See application file for complete search history.

(56) References Cited

U.S. PATENT DOCUMENTS

| 10,631,957 | B2 | 4/2020 | Hagelganz et al. | |
| 2004/0072117 | A1* | 4/2004 | Farzin-Nia | A61C 7/20 |
| | | | | 433/10 |
| 2007/0072143 | A1 | 3/2007 | Sommer | |
| 2010/0285420 | A1* | 11/2010 | Oda | A61C 7/30 |
| | | | | 433/11 |
| 2011/0081622 | A1 | 4/2011 | Mashouf | |
| 2014/0272752 | A1* | 9/2014 | Huang | A61C 7/30 |
| | | | | 433/11 |
| 2019/0175306 | A1* | 6/2019 | Lai | A61C 7/14 |
| 2023/0277280 | A1* | 9/2023 | Liang | A61C 7/28 |
| | | | | 433/10 |

FOREIGN PATENT DOCUMENTS

| CN | 107361865 | A | 11/2017 |
| CN | 208464291 | U | 2/2019 |
| CN | 209951431 | U | 1/2020 |
| CN | 111345911 | A | 6/2020 |

OTHER PUBLICATIONS

Internation Search Report of PCT/CN2021/129410, Mailed Feb. 10, 2022.

* cited by examiner

*Primary Examiner* — Ralph A Lewis

(57) ABSTRACT

Disclosed is an orthodontic self-locking system adapted to a ribbon arch wire. The orthodontic self-locking system includes a ribbon arch wire and a bracket adapted to the ribbon arch wire, where an arch wire groove is arranged on the bracket and provided with an upper single wing and a lower single wing structure; a sliding cover is mounted on the lower single wing structure, the lower single wing structure is provided with a fixed seat, a straight elastic wire on the fixed seat can be bent and deformed, and a fixed seat avoidance cavity is provided at the sliding cover and provided with a lock hook and a limiting convex rib According to the present disclosure, a self-locking structure between the bracket and the sliding cover is innovatively designed, such that manufacturing difficulty and a manufacturing cost are reduced, and self-locking stability and reliability are improved.

5 Claims, 5 Drawing Sheets

ORTHODONTIC SELF-LOCKING SYSTEM ADAPTED TO RIBBON ARCH WIRE

CROSS-REFERENCE TO RELATED APPLICATIONS

This application is a continuation of International Patent Application No. PCT/CN2021/129410 with a filing date of Nov. 8, 2021, designating the United States, now pending, and further claims priority to Chinese Patent Application No. 202011242231.5 with a filing date of Nov. 9, 2020. The content of the aforementioned applications, including any intervening amendments thereto, are incorporated herein by reference.

TECHNICAL FIELD

The present disclosure relates to the field of medical technologies of dental orthodontics, in particular to an orthodontic self-locking system adapted to a ribbon arch wire.

BACKGROUND

Bracket is an important part of orthodontics. In a traditional orthodontic treatment process, an orthodontist attaches brackets to patients' teeth and places arch wires in the arch wire grooves of brackets, and the arch wires exert force on the teeth to move them to the correct positions.

The traditional brackets have no specific limit on the arch wires, and can only use auxiliary tools such as ligature wires to bind the ligature wings of the brackets, such that the arch wires are kept in the brackets. Due to the small size of the brackets, an orthodontist has difficulty in applying ligature wires, and the binding process of ligature wires is not only time-consuming, laborious, but also highly dependent on the doctor's proficiency. In order to solve the problem, inventors in the art have designed a variety of self-locking brackets in recent years, and the arch wires can be kept in the arch wire grooves of the brackets by sliding the cover body, thereby eliminating the use of ligature wires.

However, at present, the design of the cover body self-locking structures of most self-locking brackets is complicated, especially in the design of various complex elastic members. Because the bracket structures themselves are very small, the overly complex self-locking structures and elastic members thereof not only increase the difficulty of manufacturing, but also increase the defective rate of the products, the manufacturing accuracy can not be achieved, the self-locking failure of the bracket cover bodies is likely to be caused, and the bracket cover bodies even fall off. Moreover, for the self-locking brackets, the existence of the traditional four abduction ligature wings inevitably causes formation of more prominent sharp parts at peripheries of the bracket bodies, which is likely to cause oral discomfort and poor comfort of use by the user. In the fight against food impact, the sharp shape of the traditional self-locking brackets increases the impact of food, abduction ligature wings thereof are likely to be broken by the impact of food, and teeth are likely to be damaged by impact wear.

SUMMARY

In view of the above problems, the present disclosure provides an orthodontic self-locking system adapted to a ribbon arch wire. By innovatively designing a self-locking structure between a bracket and a sliding cover, the present disclosure simplifies the self-locking structure and an elastic member thereof, reduces the manufacturing difficulty and cost, and improves stability and reliability of the self-locking bracket; and further, according to the present disclosure, the bracket adopts an upper single wing structure and a lower single wing structure, which makes an overall shape of the bracket more rounded, a shape is beautiful, usage is comfortable, not only impact of food on the bracket and teeth may be reduced, but also wing breakage may be avoided, and teeth wear is reduced.

The technical solution of the present disclosure is as follows: the orthodontic self-locking system adapted to a ribbon arch wire includes a ribbon arch wire and a bracket adapted to the ribbon arch wire, where an arch wire groove adapted to the ribbon arch wire is transversely arranged on the bracket, an upper part of the arch wire groove is provided with an upper single wing having a rounded shape, and a lower part of the arch wire groove is provided with a lower single wing structure; a sliding cover configured to block the ribbon arch wire is mounted on the lower single wing structure, left and right sides of the sliding cover match the lower single wing structure in a sliding manner, the lower single wing structure is provided with a fixed seat configured to allow a straight elastic wire to be horizontally mounted, at least one end of the straight elastic wire on the fixed seat may be bent and deformed, a fixed seat avoidance cavity is provided at a bottom of the sliding cover, and at least one side of the fixed seat avoidance cavity is provided with a lock hook and a limiting convex rib; and when the sliding cover is closed, the lower single wing structure and a tail of the sliding cover together form a lower single wing having a rounded shape.

Preferably, an operating groove configured to open the sliding cover is formed at a middle part of one side of the upper single wing close to the lower single wing structure.

Preferably, a slot configured to allow the sliding cover to be mounted is formed on the lower single wing structure, guide grooves are formed on two sides of the slot, guide rails are correspondingly arranged on the left and right sides of the sliding cover, and the guide grooves match the guide rails, such that the sliding cover may slide on the lower single wing structure.

Preferably, a slot configured to allow the sliding cover to be mounted is formed on the lower single wing structure, two sides of the slot are provided with guide rails, guide grooves are correspondingly formed on the left and right sides of the sliding cover, and the guide rails match the guide grooves, such that the sliding cover may slide on the lower single wing structure.

Preferably, the fixed seat is arranged on a slot platform configured to mount the sliding cover on the lower single wing structure, the fixed seat is a clamping seat with a clamping groove, and the straight elastic wire is horizontally mounted in the clamping groove of the clamping seat.

Preferably, the clamping seat includes a front clamping arm and a rear clamping arm, and transverse width of the front clamping arm is smaller than that of the rear clamping arm, so as to be able to provide a deformation space for the straight elastic wire to bend and deform in a pushing in direction of the sliding cover when the sliding cover is pushed in.

Preferably, a front end of the lock hook is provided with an introduction inclined plane, and when the sliding cover is initially pushed in, the introduction inclined plane may force a corresponding end of the straight elastic wire to bend and deform in the pushing in direction of the sliding cover.

Preferably, a front end and a rear end of the limiting convex rib are provided with a front downward pressing inclined plane and a rear downward pressing inclined plane separately, so as to be able to force the corresponding end of the straight elastic wire to bend and deform downwards with push-in of the sliding cover.

Preferably, the lower single wing structure is further provided with an avoidance sinking groove so as to be able to provide a downward bending space for the end of the straight elastic wire with push-in of the sliding cover.

Preferably, two sides of an upper part of the upper single wing are in a circular arc shape, and two sides of a lower part of the lower single wing structure are further in a circular arc shape; and the upper single wing and/or the sliding cover are/is provided with a positioning center line, the upper single wing is further provided with a positioning mark, a periphery of a bottom plate of the bracket is in a circular arc shape, and edges of notches on left and right sides of the arch wire groove are provided with circular arc-shaped chamfers.

The present disclosure has the beneficial effects as follows: the self-locking structure between the bracket and the sliding cover is innovatively designed, such that the self-locking structure and the elastic member thereof are simplified, the manufacturing difficulty and the manufacturing cost are reduced, stability and reliability of the self-locking bracket are improved, and the sliding cover has a limited hand feel and a gear position arriving sound in opening and closing processes. Further, compared with a traditional bracket with four abduction wings, the bracket with the upper and lower single wing structures used by the present disclosure have a more rounded and beautiful shape, which eliminates a sharp part formed by the four abduction wings of the existing self-locking bracket, make the shape more rounded and beautiful, make usage more comfortable, and is conductive to impact of less food on a bracket body and the teeth, the situation that the abduction wings are broken by impact is avoided, and the wear of the teeth caused by food impact is reduced, which is conductive to protect tooth health.

Figure 1:
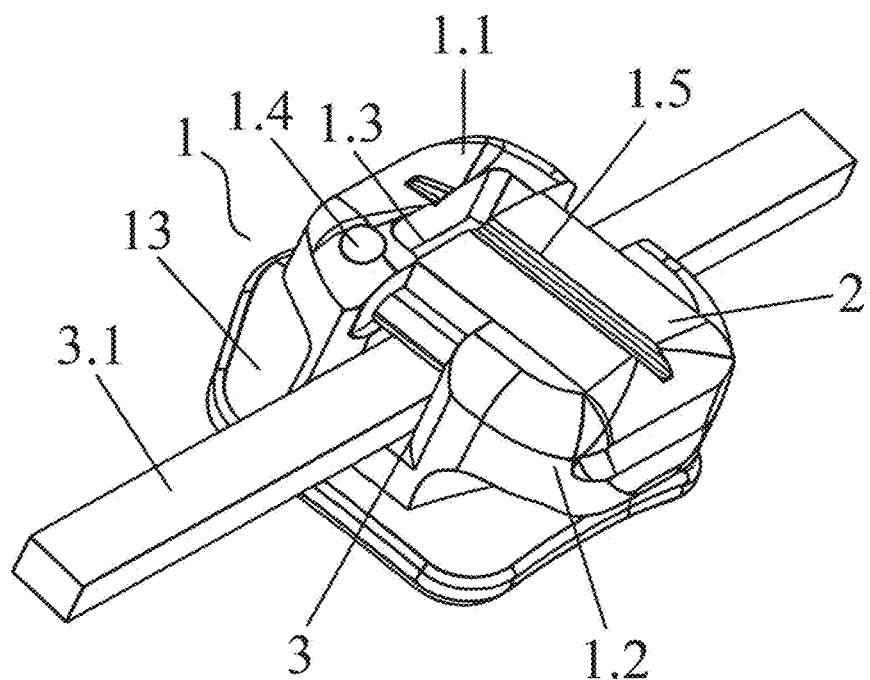
FIG. 1 is a three-dimensional schematic structural diagram of an orthodontic self-locking system adapted to a ribbon arch wire in Example 1.
Figure 2:
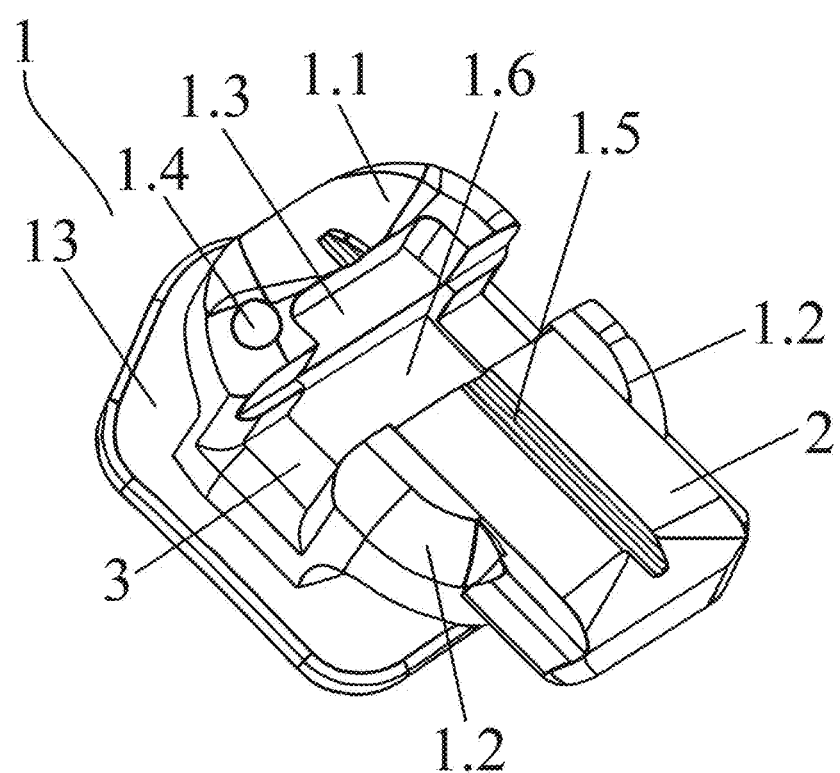
FIG. 2 is a three-dimensional schematic structural diagram of a bracket and a sliding cover in an opening state in Example 1.

Description of numerals: 1. bracket; 1.1. upper single wing; 1.2. lower single wing structure; 1.3. operating groove; 1.4. positioning mark; 1.5. positioning center line; 1.6. inner groove; 1.7. circular arc-shaped chamfer; 2. sliding cover; 2.1. tail; 3. arch wire groove; 3.1. ribbon arch wire; 4. straight elastic wire; 5. fixed seat; 5.1. clamping groove; 5.2. front clamping arm; 5.3. rear clamping arm; 6. fixed seat avoidance cavity; 7. lock hook; 7.1. introduction inclined plane; 8. limiting convex rib; 8.1. front downward pressing inclined plane; 8.2. rear downward pressing inclined plane; 9. guide groove; 10. guide rail; 11. first gear; 12. second gear; 13. bottom plate; 14. avoidance sinking groove.

DETAILED DESCRIPTION OF THE EMBODIMENTS

The technical solution in the examples of the present disclosure is clearly and completely described below with reference to the accompanying drawings in the examples of the present disclosure. Apparently, the described examples are some rather than all of the examples of the present disclosure. Based on the examples of the present disclosure, all the other examples obtained by those of ordinary skill in the art without inventive effort are within the scope of protection of the present disclosure.

It should be noted that when a component is said to be "connected" to another component, it may be directly connected to another component or a mediate component may also exist. When a component is considered to be "arranged on" another component, it may be directly arranged on another component or further, a mediate component may exist.

Unless otherwise defined, all technical and scientific terms used here have the same meanings as commonly understood by those skilled in the art to which the present disclosure belongs. The terms used in the specification of the present disclosure here are only for the objective of describing specific examples, and not intended to limit the present disclosure. The term "and/or" used here includes any and all combinations of one or more related listed items.

Example 1

With reference to FIG. 1 to FIG. 8, an orthodontic self-locking system adapted to a ribbon arch wire of the present disclosure includes a ribbon arch wire and a bracket adapted to the ribbon arch wire, an arch wire groove 3 adapted to the ribbon arch wire is transversely arranged on the bracket 1, an upper part of the arch wire groove 3 is provided with an upper single wing 1.1 having a rounded shape, and a lower part of the arch wire groove 3 is provided with a lower single wing structure 1.2; a sliding cover 2 configured to block the ribbon arch wire is mounted on the lower single wing structure 1.2, left and right sides of the sliding cover 2 match the lower single wing structure 1.2 in a sliding manner, the lower single wing structure 1.2 is provided with a fixed seat 5 configured to allow a straight elastic wire 4 to be horizontally mounted, the straight elastic wire 4 is horizontally mounted on the fixed seat 5 in a direction parallel to the ribbon arch wire groove, the straight elastic wire 4 is an elastic straight rod, and a left end of the straight elastic wire 4 may be bent and deformed, that is, the left end of the straight elastic wire 4 is a cantilever end, which may be bent and deformed in a pushing in direction of the sliding cover and may be bent and deformed downwards; and a fixed seat avoidance cavity 6 configured to avoid the fixed seat 5 when traveling is provided at a bottom of the sliding cover 2, and one side of the fixed seat avoidance cavity 6 is provided with a lock hook 7 and a limiting convex rib 8. A tail 2.1 of the sliding cover is a rounded tail, that is, there are no two convex parts on left and right sides of the tail, and when the sliding cover 2 is closed, the lower single wing structure 1.2 and the tail of the sliding cover 2 together form a lower single wing having a rounded shape.

An operating groove 1.3 configured to open the sliding cover 2 is formed at a middle part of one side of the upper single wing 1.1 close to the lower single wing structure. Two sides of an upper part of the upper single wing 1.1 are in a circular arc shape, and two sides of a lower part of the lower single wing structure 1.2 are also in a circular arc shape. The upper single wing 1.1 and/or the sliding cover 2 are/is provided with a positioning center line 1.5. The upper single wing 1.1 is also provided with a positioning mark 1.4. A periphery of a bottom plate 13 of the bracket 1 is in a circular arc shape. An inner groove 1.6 is formed in a center of the ribbon arch wire groove 3, which is configured to reduce a contact surface between the arch wire groove 3 and a ribbon arch and reduce friction, and edges of notches on left and right sides of the arch wire groove 3 are provided with circular arc-shaped chamfers 1.7 so as to conveniently introduce the ribbon arch wire 3.1.

Figure 3:
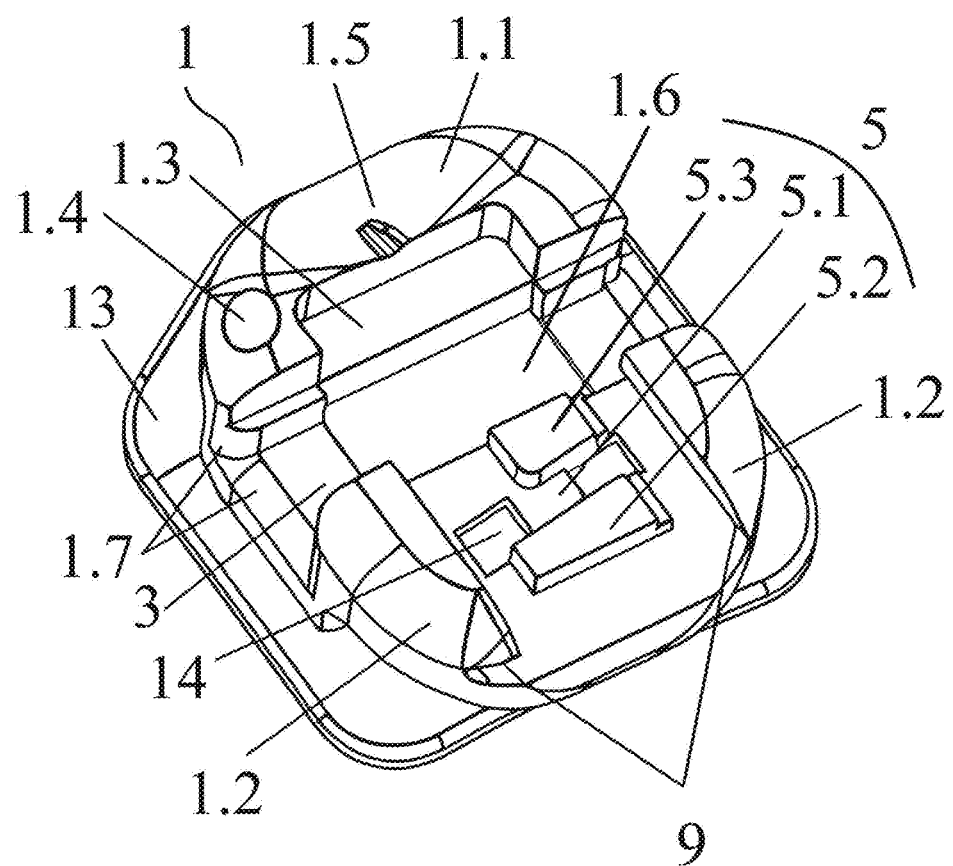
FIG. 3 is a three-dimensional schematic structural diagram of the bracket with a single-side lock latch in Example 1.
Figure 4:
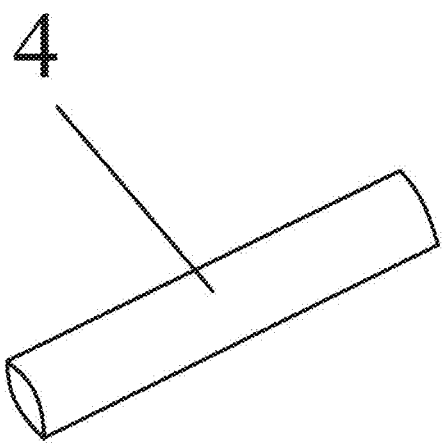
FIG. 4 is a three-dimensional schematic structural diagram of a straight elastic wire in Example 1.
Figure 5:
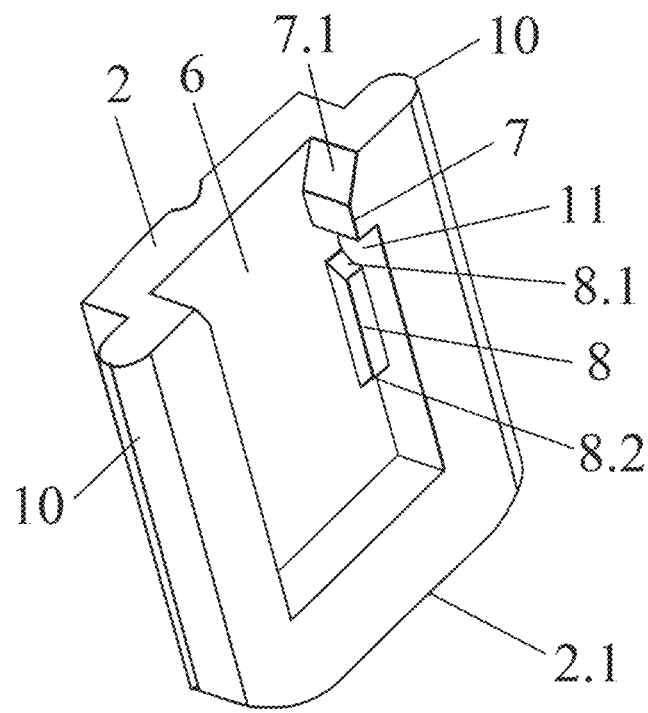
FIG. 5 is a three-dimensional schematic structural diagram of the sliding cover with a single-side lock latch in Example 1.

With reference to FIG. 3 to FIG. 5, guide grooves 9 are formed on the lower single wing structure 1.2, the left and right sides of the sliding cover 2 are correspondingly provided with guide rails 10, and the guide grooves 9 match the guide rails 10, such that the sliding cover 2 may slide on the lower single wing structure 1.2 in a direction perpendicular to the arch wire groove. In another example, the lower single wing structure 1.2 is provided with guide rails, guide grooves are correspondingly formed on the left and right sides of the sliding cover, and the guide rails match the guide grooves, such that the sliding cover may slide on the lower single wing structure 1.2 in the direction perpendicular to the arch wire groove.

With reference to FIG. 3 to FIG. 5, the fixed seat 5 is a clamping seat with a horizontal clamping groove 5.1, the straight elastic wire 4 is horizontally mounted in the clamping groove in the direction parallel to the ribbon arch wire, and at the moment, the straight elastic wire 4 and the arch wire groove are parallel to each other. Specifically, a middle of the straight elastic wire 4 is fixed by the clamping seat, and at least one end of the straight elastic wire is the cantilever end. The clamping seat includes a front clamping arm 5.2 and a rear clamping arm 5.3, the width of the front clamping arm 5.2 is smaller than that of the rear clamping arm 5.3, so as to be able to provide a deformation space for the straight elastic wire 4 to bend and deform in the pushing in direction of the sliding cover 2 when the sliding cover 2 is pushed in, and further, the rear clamping arm 5.3 may interact with the lock hook 7 to prevent the sliding cover 2 from slipping off.

With reference to FIG. 3 to FIG. 5, a front end of the lock hook 7 is provided with an introduction inclined plane 7.1, and when the sliding cover 2 is initially pushed in, the introduction inclined plane 7.1 may force the cantilever end of the straight elastic wire 4 to bend and deform in the pushing in direction of the sliding cover; and when the sliding cover continues to be pushed in, the cantilever end of the straight elastic wire may fall into a first gear 11 between the lock hook 7 and a front end of the limiting convex rib 8.

With reference to FIG. 3 to FIG. 5, front and rear ends of the limiting convex rib 8 are provided with a front downward pressing inclined plane 8.1 and a rear downward pressing inclined plane 8.2 separately, when the sliding cover 2 is continues to be pushed in from the first gear 11, the front downward pressing inclined plane 8.1 may force the cantilever end of the straight elastic wire 4 to bend and deform downwards, until the sliding cover 2 is pushed in completely, the corresponding end of the straight elastic wire 4 returns upwards, at the moment, the sliding cover reaches a second gear 12, that is, the sliding cover 2 is in a closed state, and the arch wire is blocked in the arch wire groove 3; and when the sliding cover 2 is pushed out, the rear downward pressing inclined plane 8.2 may force the cantilever end of the straight elastic wire 4 to bend and deform downwards, until the sliding cover 2 is pushed out to the first gear 11, the cantilever end of the straight elastic wire 4 returns upwards, at the moment, the sliding cover reaches the first gear 11, that is, the sliding cover 2 is in an opening state, that is, the arch wire groove 3 is in an opening state, and the arch wire may be put in or taken out.

With reference to FIG. 3 to FIG. 5, an avoidance sinking groove 14 is further formed on the lower single wing structure 1.2, which may provide a downward bending space for the cantilever end of the straight elastic wire when the sliding cover 2 is in a switching state between the first gear 11 and the second gear 12.

Figure 6:
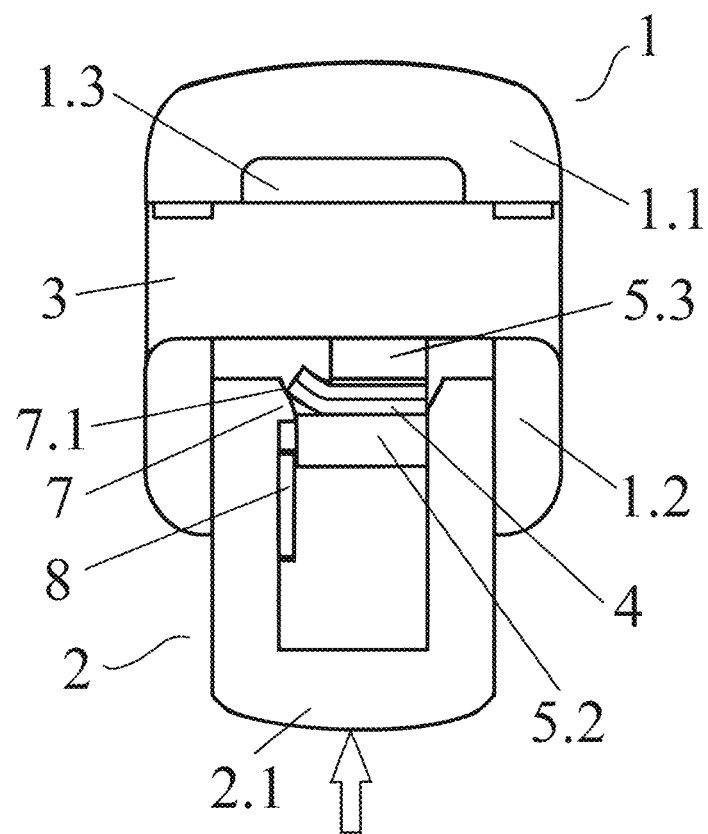
FIG. 6 is a schematic diagram of a process of mounting the sliding cover on the bracket in Example 1.
Figure 7:
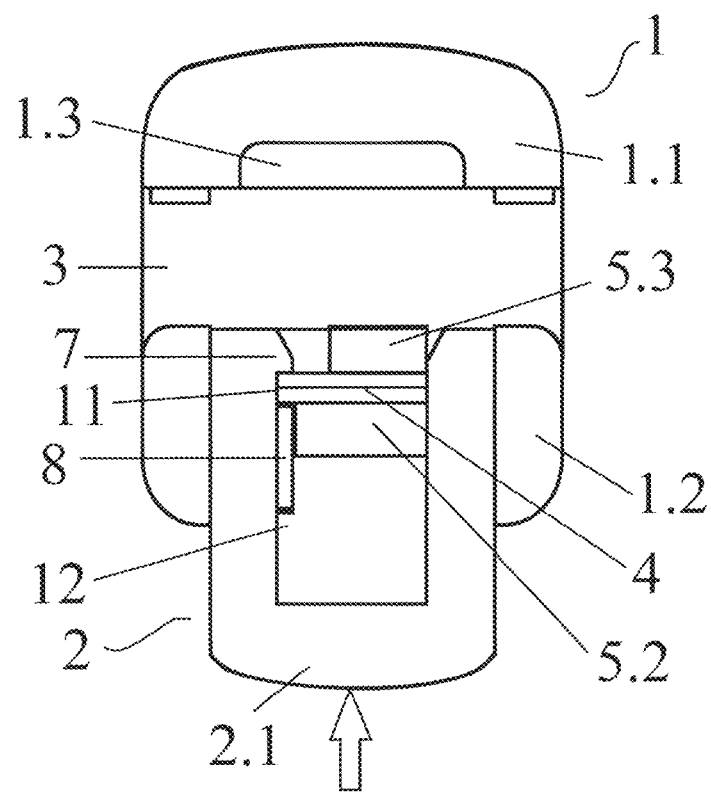
FIG. 7 is a schematic diagram of a process of the sliding cover sliding to a first gear in Example 1.
Figure 8:
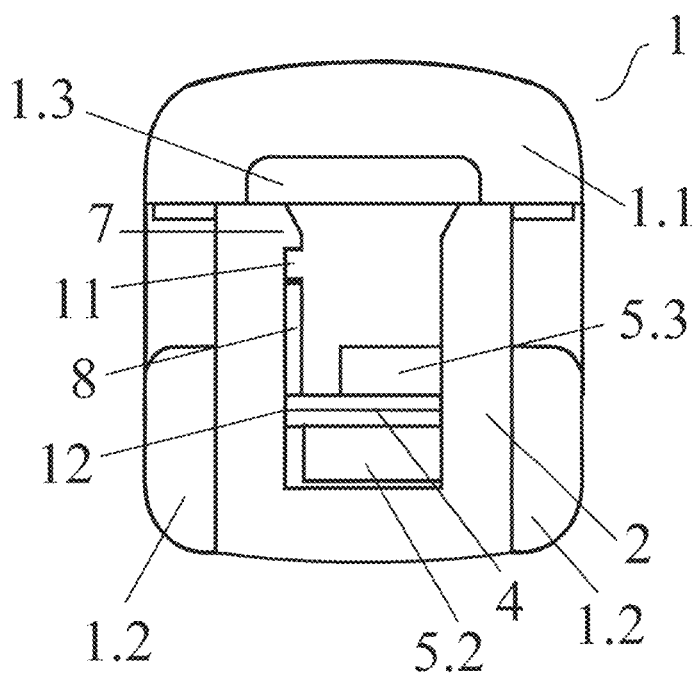
FIG. 8 is a schematic diagram of a process of the sliding cover sliding to a second gear in Example 1.

With reference to FIG. 6 to FIG. 8, a working process of the present disclosure includes:

1. A Sliding Cover Mounting Process

The guide rails 10 on the left and right sides of the sliding cover 2 are pushed in along the guide grooves 9 on the lower single wing structure 1.2, the cantilever end of the straight elastic wire 4 is pressed by the introduction inclined plane 7.1 at a front end of the sliding cover 2 to bend and deform forwards, the sliding cover 2 continues to be pushed in, the cantilever end of the straight elastic wire 4 passes over the lock hook 7 and enters the first gear 11, this time, the sliding cover 2 is mounted on the lower single wing structure 1.2, and because the cantilever end of the straight elastic wire 4 is clamped back and forth by the lock hook 7 and the front clamping arm 5.2 of the fixed seat 5, the sliding cover 2 does not slip off the lower single wing structure 1.2.

2. A Sliding Cover Closing Process

The sliding cover 2 continues to be pushed in, the cantilever end of the straight elastic wire 4 is pressed by the front downward pressing inclined plane 8.1 of the limiting convex rib 8, the cantilever end of the straight elastic wire is bent and deformed downwards, a tail end thereof is pressed to sink into the avoidance sinking groove 14, at the moment, the sliding cover 2 continues to be pushed in, when the cantilever end of the straight elastic wire 4 completely passes over the limiting convex rib 8 to reach the second gear 12, the cantilever end of the straight elastic wire 4 returns to a straight state, the sliding cover 2 completely covers the arch wire groove 3 on the bracket 1, and the sliding cover 2 is closed and locked.

3. A Sliding Cover Opening Process

The sliding cover 2 is pushed out outwards, the cantilever end of the straight elastic wire 4 is pressed by the rear downward pressing inclined plane 8.2 of the limiting convex rib 8, the cantilever end of the straight elastic wire is bent and deformed downwards, a tail end thereof is pressed to sink into the avoidance sinking groove 14, at the moment, the sliding cover 2 continues to be pushed out, when the cantilever end of the straight elastic wire 4 completely passes over the limiting convex rib 8 to reach the first gear 11, the cantilever end of the straight elastic wire 4 returns to a straight state, and at the moment, the sliding cover 2 is opened. Because the cantilever end of the straight elastic wire 4 is clamped back and forth by the lock hook 7 and the front clamping arm 5.2 of the fixed seat 5, the sliding cover 2 does not slip off the lower single wing structure 1.2.

Example 2

Figure 9:
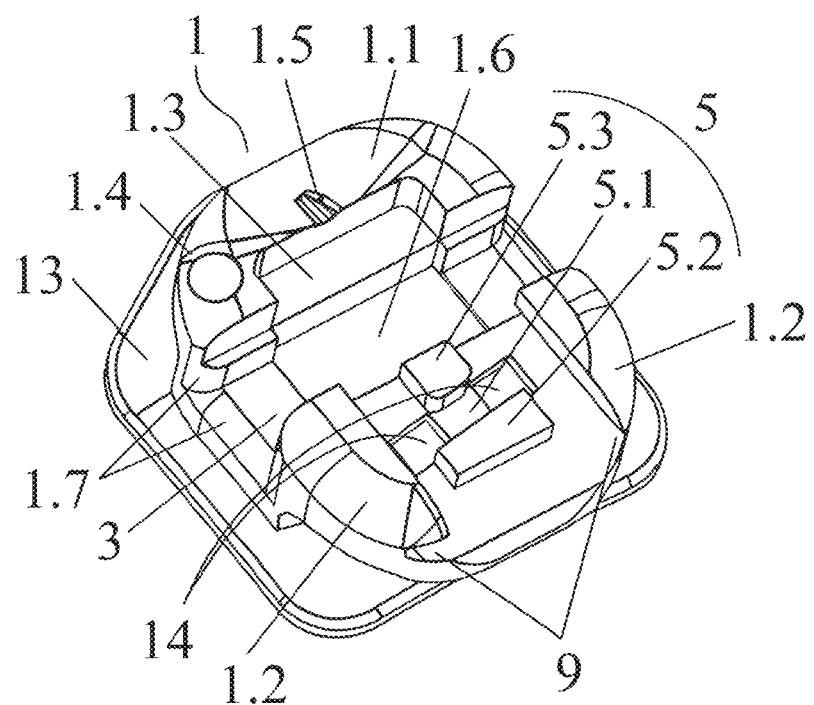
FIG. 9 is a three-dimensional schematic structural diagram of a bracket with a single-side lock latch in Example 2.
Figure 10:
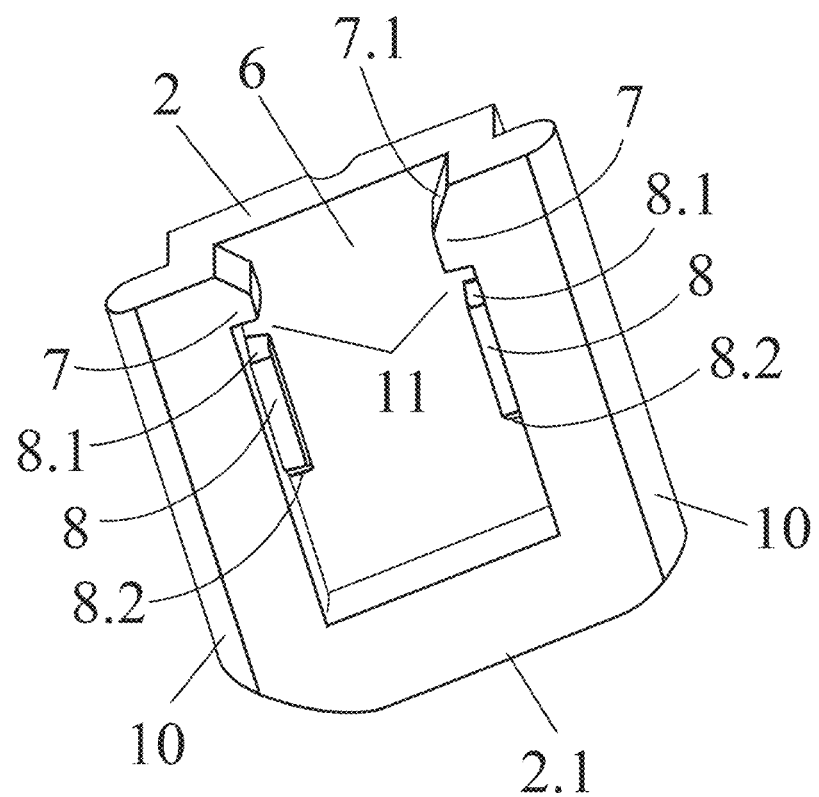
FIG. 10 is a three-dimensional schematic structural diagram of a sliding cover with a single-side lock latch in Example 2.

With reference to FIG. 9 and FIG. 10, on the basis of Example 1, the fixed seat 5 is changed to shorten the length of the rear clamping arm 5.3, avoidance sinking grooves 14 are separately formed at two ends of the horizontal clamping groove 5.1, such that left and right ends of the straight elastic wire 4 mounted on the fixed seat 5 may be bent and deformed, that is, the two ends of the straight elastic wire 4 are cantilever ends; and further, the sliding cover 2 is changed, left and right sides in the fixed seat avoidance cavity 6 of the sliding cover 2 are correspondingly provided with the lock hook 7, the limiting convex rib 8 and a changing bracket 1 separately, and an avoidance sinking groove 14 is formed on each of the lower single wing structures 1.2 on left and right sides of the fixed seat 5 separately, which may provide a space for the cantilever end of the straight spring wire to bend downwards when the sliding cover 2 is in the switching state between the first gear 11 and the second gear 12.

Example 3

On the basis of Example 1 or 2, mounting height of the straight elastic wire 4 on the fixed seat 5 is changed, when the mounting height of the straight elastic wire 4 is high, that is, when the cantilever end of the straight elastic wire is bent downwards with enough space, the avoidance sinking groove 14 may not be provided.

The technical features of the above examples can be combined at will. In order to make the description concise, not all possible combinations of the technical features in the above examples are described. However, as long as there is no contradiction among the combinations of these technical features, they should be considered as the scope described in the specification. When the technical features in different examples are reflected in the same accompanying drawing, it can be regarded that further, the accompanying drawing also discloses the combined examples of the various examples involved.

What is claimed is:

1. An orthodontic self-locking system adapted to a ribbon arch wire, comprising:
   a ribbon arch wire; and
   a bracket adapted to the ribbon arch wire, wherein
      an arch wire groove adapted to the ribbon arch wire is transversely arranged on the bracket, an upper part of the arch wire groove is provided with an upper single wing having a rounded shape, and a lower part of the arch wire groove is provided with a lower single wing structure,
      a sliding cover is mounted on the lower single wing structure, the sliding cover is configured to block the ribbon arch wire in the arch wire groove, left and right sides of the sliding cover match the lower single wing structure in a sliding manner, the lower single wing structure is provided with a fixed seat configured to allow a straight elastic wire to be horizontally mounted, at least one end of the straight elastic wire on the fixed seat is bent and deformed,
      a fixed seat avoidance cavity is provided at a bottom of the sliding cover, and at least one side of the fixed seat avoidance cavity is provided with a lock hook and a limiting convex rib, and
      when the sliding cover is closed, the lower single wing structure and a tail of the sliding cover together form a lower single wing having a rounded shape;
   wherein the fixed seat comprises a front clamping arm, a rear clamping arm, and a clamping groove arranged between the front clamping arm and the rear clamping arm, and the straight elastic wire is horizontally mounted in the clamping groove and clamped by the front clamping arm and the rear clamping arm;
   wherein transverse width of the front clamping arm is smaller than that of the rear clamping arm, so as to provide a first space for the straight elastic wire to bend and deform in a pushing direction of the sliding cover when the sliding cover is pushed in;
   wherein a front end of the lock hook is provided with an introduction inclined plane, when the sliding cover is initially pushed in, the introduction inclined plane force a corresponding end of the straight elastic wire to deform and bend into the first space in the pushing direction of the sliding cover; and
   in a first locking position, the straight elastic wire is clamped by the rear clamping arm and a rear end of the lock hook, and the corresponding end of the straight elastic wire is in a straight state;
   wherein the lower single wing structure is further provided with an avoidance sinking groove so as to provide a second space for the corresponding end of the straight elastic wire with push-in of the sliding cover; and
   wherein a front end and a rear end of the limiting convex rib are respectively provided with a front pressing inclined plane and a rear pressing inclined plane, so as to force the corresponding end of the straight elastic wire to deform and bend into the second space with the push-in of the sliding cover; and
   in a second locking position, the straight elastic wire is clamped by the rear clamping arm and the rear pressing inclined plane, and the corresponding end of the straight elastic wire returns to the straight state.

2. The orthodontic self-locking system adapted to a ribbon arch wire according to claim 1, wherein an operating groove configured to open the sliding cover is formed at a middle part of one side of the upper single wing close to the lower single wing structure.

3. The orthodontic self-locking system adapted to a ribbon arch wire according to claim 1, wherein a slot configured to allow the sliding cover to be mounted is formed on the lower single wing structure, guide grooves are formed on two sides of the slot, guide rails are correspondingly arranged on the left and right sides of the sliding cover, and the guide grooves match the guide rails, such that the sliding cover slide on the lower single wing structure.

4. The orthodontic self-locking system adapted to a ribbon arch wire according to claim 1, wherein a slot configured to allow the sliding cover to be mounted is formed on the lower single wing structure, two sides of the slot are provided with guide rails, guide grooves are correspondingly formed on the left and right sides of the sliding cover, and the guide rails match the guide grooves, such that the sliding cover slide on the lower single wing structure.

5. The orthodontic self-locking system adapted to a ribbon arch wire according to claim 1, wherein two sides of an upper part of the upper single wing are in a circular arc shape, and two sides of a lower part of the lower single wing structure are further in a circular arc shape; and the upper single wing and/or the sliding cover are/is provided with a positioning center line, the upper single wing is further provided with a positioning mark, a periphery of a bottom plate of the bracket is in a circular arc shape, and edges of notches on left and right sides of the arch wire groove are provided with circular arc-shaped chamfers.

* * * * *